United States Patent [19]

Holloway

[11] Patent Number: 4,540,495
[45] Date of Patent: Sep. 10, 1985

[54] PROCESS FOR TREATING MUNICIPAL SOLID WASTE

[75] Inventor: Clifford C. Holloway, Birmingham, Ala.

[73] Assignees: Lewis B. Holloway; Winford B. Holloway, both of Birmingham, Ala.; part interest to each

[21] Appl. No.: 610,428

[22] Filed: May 15, 1984

[51] Int. Cl.³ ............................................. C02F 11/18
[52] U.S. Cl. ..................................... 210/774; 210/808
[58] Field of Search ................................ 210/766–771, 210/774, 780, 806, 808; 426/635

[56] References Cited

U.S. PATENT DOCUMENTS

| | | | |
|---|---|---|---|
| 3,549,010 | 12/1970 | Marsh et al. | 210/769 X |
| 3,849,246 | 11/1974 | Raymond et al. | 210/774 X |
| 4,157,961 | 6/1979 | Borst | 210/768 |
| 4,185,680 | 1/1980 | Lawson | 210/770 X |
| 4,321,150 | 3/1982 | McMullen | 210/771 X |
| 4,342,830 | 8/1982 | Holloway | 426/635 X |

Primary Examiner—Thomas Wyse
Attorney, Agent, or Firm—Woodford R. Thompson, Jr.

[57] ABSTRACT

A process for treating municipal solid waste material in the presence of moisture for the separation and recovery of inorganic matter and organic matter wherein the waste material is fed into a pressure chamber and is agitated therein. The contents of the pressure chamber are subjected to heat under a pressure for a predetermined period of time to cook, sterilize and soften the organic matter contained therein. The moisture content of the waste material is controlled so that the fines of the organic fraction have a residual moisture content ranging from about 60% to 70%. After releasing the pressure from the pressure chamber, the cooked waste material is removed and then separated and classified into various fractions thereof including an inorganic fraction and the fines of the organic fraction having a residual moisture content ranging from approximately 60% to 70%.

10 Claims, 6 Drawing Figures

A – fines
B – middles
C – overs

A – fines
B – middles
C – overs

A – fines
B – middles
C – overs

A – fines
B – middles
C – overs

PROCESS FOR TREATING MUNICIPAL SOLID WASTE

BACKGROUND OF THE INVENTION

This invention relates to a process for treating municipal solid waste material and more particularly to such a process which is adapted to separate and classify municipal solid waste into various inorganic, organic and synthetic fractions thereof. The major portion of the inorganic fraction consists of metal and glass containers while the remainder consists of bits of masonry, ceramics, automobile parts, building materials and the like. The synthetic fraction usually consists of plastic containers, plastic film, toys, toothbrushes and the like in addition to a variety of materials such as articles of clothing. The organic fraction usually represents more than 80% by weight of the municipal solid waste and consists largely of ligno-cellulose, such as paper products, with the remainder consisting of yard waste, food scraps, dead animals and the like.

The organic fraction of municipal solid waste represents the industrial world's largest economically assessible source of ligno-cellulose feed stock for conversion to alcohol and other industrial chemicals. At the same time, municipal solid waste is an environmental concern to which the industrial world is attempting to find a solution due to the depletion of natural resources and the dwindling availability of land fill areas.

Heretofore, the most common method for classifying municipal solid waste materials has been by air classification wherein the waste materials are first shredded or ground for particle size reduction. This material is then subjected to currents of upwardly flowing air whereby the lighter fraction thereof tends to float as the heavier materials sink. The major portion of this lighter fraction consists of paper, plastic film, fabric and the like while the heavier fraction consists of wet paper, metals, glass, plastic, fruit, vegetables, meats, wood and the like. This method requires considerable time and energy in the shredding of the municipal solid waste materials. Also, bits of glass and metal are embedded in the lighter fraction since the waste material has not been properly classified into metal, glass, plastic, paper, food scraps and the like.

Another method heretofore employed utilizes the paper industry's technique for pulping. In this method, municipal solid waste is subjected to size reduction and is then placed in large vats where the organic fraction is pulped into a slurry of approximately 3% solids. The heavier metals, glass, masonry and the like may then be removed by settling or centrifuging. This method is also energy intensive in that large quantities of water are required in order to produce a slurry of 3% solids. This excess water must then be removed, such as by dewatering the slurry to a cake of less than 50% moisture to produce a product which may then be used as a fuel.

The Grube U.S. Pat. No. 4,050,899, dated Sept. 27, 1977, discloses a method for fragmenting solid waste wherein the waste material is dehydrated, comminuted and expelled into an open ended composting pit.

In my prior U.S. Pat. No. 4,342,830, dated Aug. 3, 1982, steam pressure separation is disclosed wherein softened organics are forced through perforations upon sudden release of pressure whereby inorganics, such as cans, bottles and the like are left behind. This method is somewhat more energy intensive than some of the methods heretofore employed to classify municipal solid waste in that the steam used to force the softened organics out is difficult to recover.

SUMMARY OF THE INVENTION

To overcome the above and other difficulties, I provide a process for treating municipal solid waste material wherein the municipal solid waste material is fed into a closed pressure chamber with the environment within the pressure chamber being controlled as the waste material is mixed therein to produce various fractions thereof, including an inorganic fraction and the fines of an organic fraction having a residual moisture content of a predetermined value. This municipal solid waste material produced within the pressure chamber under controlled conditions may then be readily separated and classified on conventional separating apparatus, such as vibrating screens common to the extractive industry.

An object of my invention is to provide improved means for the disposal of municipal solid waste materials at a profit and at the same time may be adapted for co-disposal of primary sewage sludge which in turn increases the yield of alcohol in that the yeast utilizes the nitrogen in the sewage as a nutrient. My improved process is thus adapted to produce an economical substrate for the production of alcohol and other industrial chemicals.

A more specific object of my invention is to provide improved means for sterilizing, particle size reduction and partial hydralization of the organic fraction of the municipal solid waste feed stock for fermentation.

A more general object of my invention is to provide a process for reducing the volume of the municipal solid waste material for disposal and at the same time provide a means for recovering metals, plastic, glass and the like without shredding prior to separation.

DESCRIPTION OF THE DRAWINGS

Apparatus which may be employed to carry out my improved process and graphs showing the effect of various operating conditions on the distribution of processed municipal solid waste among materials having fine size particles, materials having middle size particles and materials having larger size particles is illustrated in the accompanying drawings, forming a part of this application, in which.

DETAILED DESCRIPTION

Figure 1:
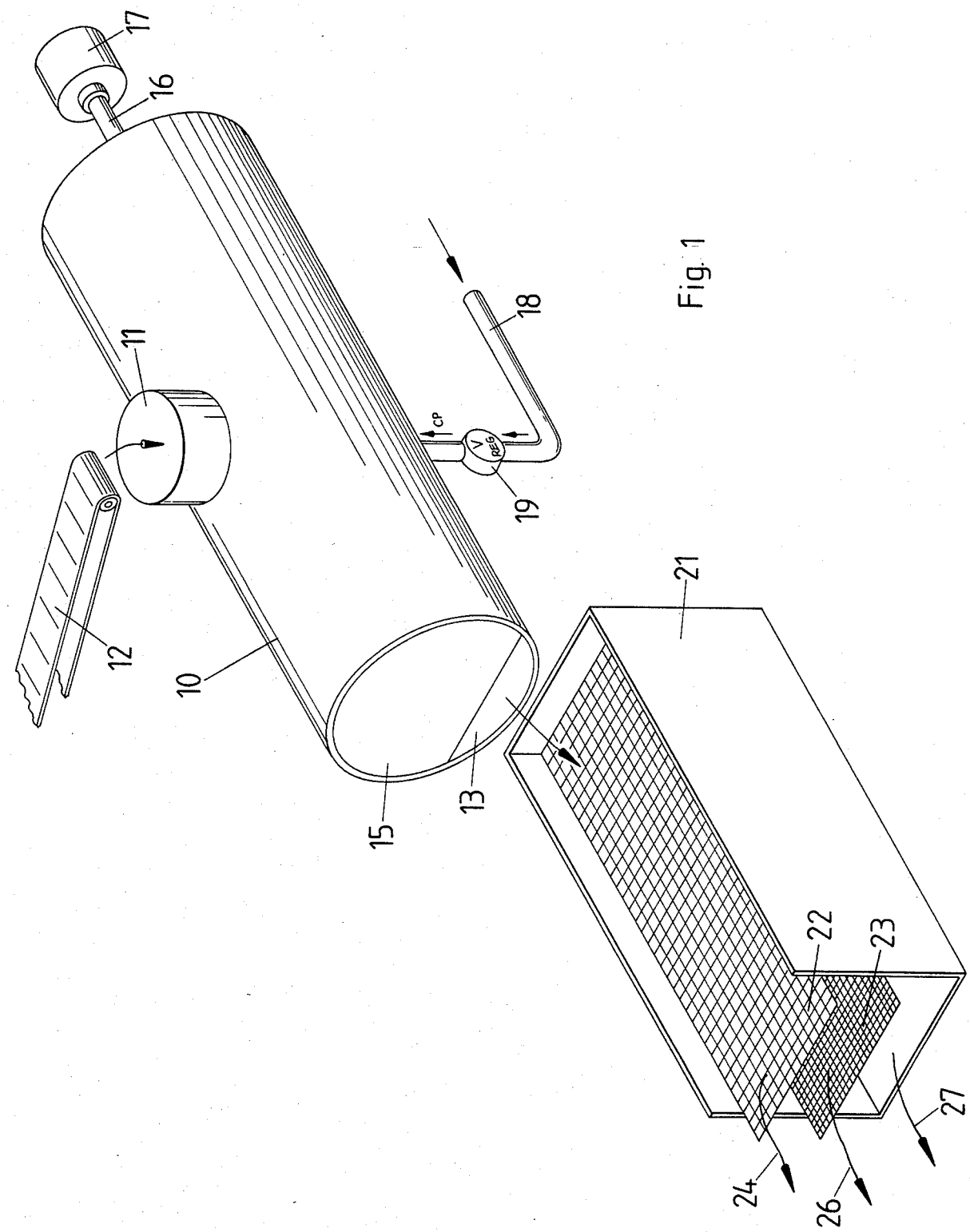
FIG. 1 is a schematic diagram showing apparatus which may be employed to carry out my improved process.

Referring now to the drawings for a better understanding of my invention, I show a pressure chamber 10 having a hatch 11 in the top thereof through which municipal solid waste is introduced into the pressure chamber. The municipal solid waste is delivered to the hatch 11 by suitable means, such as an endless conveyor belt indicated generally at 12. Preferably, the pressure chamber 10 is in the form of an elongated cylindrical chamber which is sloped approximately 15° from the horizontal whereby gravity aids in discharging the final product through a discharge door 13 provided in the lower portion of the discharge end wall 15 of the pressure chamber 10, as shown. The pressure chamber 10 is capable of withstanding a pressure of at least 75 psi (gauge).

The municipal solid waste material fed into the pressure chamber 10 is agitated by suitable means, such as a conventional agitator carried by a centrally disposed shaft 16 which extends longitudinally of the pressure chamber 10 and is driven by a motor 17. That is, the shaft 16 carries suitable mixing fins which agitate the waste material within the pressure chamber 10 in a manner well understood in the art to which my invention relates. In view of the fact that such agitating or mixing apparatus is well known in the art to which my invention relates, no further description thereof is deemed necessary.

Steam is supplied to the pressure chamber 10 through a steam supply conduit 18 which communicates with the lower portion of the pressure chamber 10, as shown. The pressure in the pressure chamber 10 is controlled by a pressure regulating valve 19 to maintain a pressure within the pressure chamber 10 ranging from approximately 40 psig to 75 psig for a period ranging from approximately 30 minutes to 90 minutes to cook and sterilize the waste material and soften the organic matter contained therein. Preferably, the municipal solid waste material in the pressure chamber is subjected to a pressure of approximately 50 psig for a period of approximately 60 minutes. That is, in actual practice, I have found that the most efficient internal environment within the pressure chamber 10 is provided where the waste material is subjected to a pressure of approximately 50 psig for approximately 60 minutes. The waste material in the pressure chamber 10 is heated to a temperature ranging from approximately 270° F. to approximately 320° F. by the introduction of steam into the pressure chamber as described hereinabove.

The product discharged through the door 13 of the pressure chamber 10 falls onto a vibrating screen unit, indicated generally at 21, having an upper screen element 22 which is approximately of a 2 inch mesh and a lower screen element 23 which is approximately of a ½ inch mesh. Accordingly, the materials having fine size particles and middle size particles pass through the upper screen element 22 onto the lower screen element 23 while the materials having a larger particle size are retained on the upper screen element 22 until discharged therefrom, as at 24. The materials having fine size particles pass through the lower screen 23 while the materials having middle size particles are retained on the lower screen 23 until discharged as at 26. The materials having fine size particles are discharged as at 27 after passing through the lower screen element 23. In view of the fact that vibrating screen units are well known in the art to which my invention relates, no further description thereof is deemed necessary.

In order for the vibrating screens 22 and 23 to separate and classify the municipal solid waste effectively, the internal environment of the pressure vessel must be controlled accurately. In addition to the parameters relating to heating the pressure vessel under a pressure ranging from approximately 40 psig to 75 psig for a period ranging from approximately 30 minutes to 90 minutes to cook and sterilize the waste material and soften the organic matter contained therein, there is an additional parameter which is critical and which must be controlled accurately to assure proper separation and classification of the various fractions of the municipal solid waste material. That is, it is essential that the moisture content of the waste material cooked in the pressure chamber be controlled so that the fines of the organic fractions thereof have a residual moisture content ranging from approximately 60% to 70%. In actual practice, I have found that it is preferable that the residual moisture content of the fines of the organic fraction of the processed product be approximately 65%. It is very essential that the moisture content of the waste material cooked in the pressure chamber 10 be controlled accurately to produce fines of the organic fraction which have a residual moisture content as set forth above in order for the various fractions of the cooked waste material to be separated from each other. In actual practice I have found that where the moisture content of the fines of the organic fraction have a residual moisture content above or below that set forth hereinabove, the various fractions of the processed product discharged onto the vibrating screen unit 21 cannot be economically separated and classified.

To provide efficient heat-mass transfer and efficient mixing of the constituents introduced into the pressure chamber, the volume of all constituents fed into the pressure chamber should not exceed approximately 70% of the total volume of the pressure chamber.

From the foregoing description, the operation of my improved process will be readily understood.

As one example of the manner in which my improved process is carried out, 600 pounds of municipal solid waste is fed to the hatch 11 of the pressure chamber 10 by suitable means, such as the endless belt 12. 300 pounds of primary sewage sludge at 100° F. is added to the pressure chamber. Steam is introduced into the pressure chamber to bring the pressure up to 50 psig and this pressure is then maintained for one hour. The pressure is controlled by the pressure regulator valve 19 in a manner well understood in the art. The material is mixed continuously during the one hour period to bring about efficient mixing and heat-mass transfer between all constituents introduced into the pressure chamber. Steam is released at the end of the one hour period and the product is discharged through door 13 onto the vibrating screen unit 21. Materials having large size particles, hereinafter referred to as "overs", such as bottles, cans and the like, are retained on the 2 inch mesh screen 22. The materials having middle size particles, such as bottle caps, coins, broken glass, corncobs, bits of wood and other organics which need further treatment, hereinafter referred to as "middles" pass through the 2 inch mesh screen 22 onto the ½ mesh screen 23 and are retained thereon. The material passing through both of the screens 22 and 23 represents the organic fraction, hereinafter referred to as "fines", which is suitable for conversion to alcohol or other industrial chemicals.

The example set forth above wherein a mixture of 600 pounds municipal solid waste and 300 pounds of primary sewage sludge are subjected to live steam at 50 psig for one hour was repeated several times and the averages of the municipal solid waste separation and classification on the vibratory screen unit 21 are listed as follows:

| Percent by Weight of Municipal Solid Waste (MSW) Fines (organics for conversion to alcohol) - 86% Products for recycling - 14% The 14% products for recycling consists of: | | |
|---|---|---|
| | of 14% | of total MSW |
| Aluminum cans = | 9.49% | 1.33% |
| Ferric metal = | 28.40% | 3.98% |
| Plastic = | 8.36% | 1.17% |
| Glass = | 11.39% | 1.59% |
| Wood = | 0.34% | 0.05% |
| Fabric = | 2.47% | 0.35% |
| Miscellaneous = | 39.58% | 5.54% |
| | 100% | |

Figure 2:
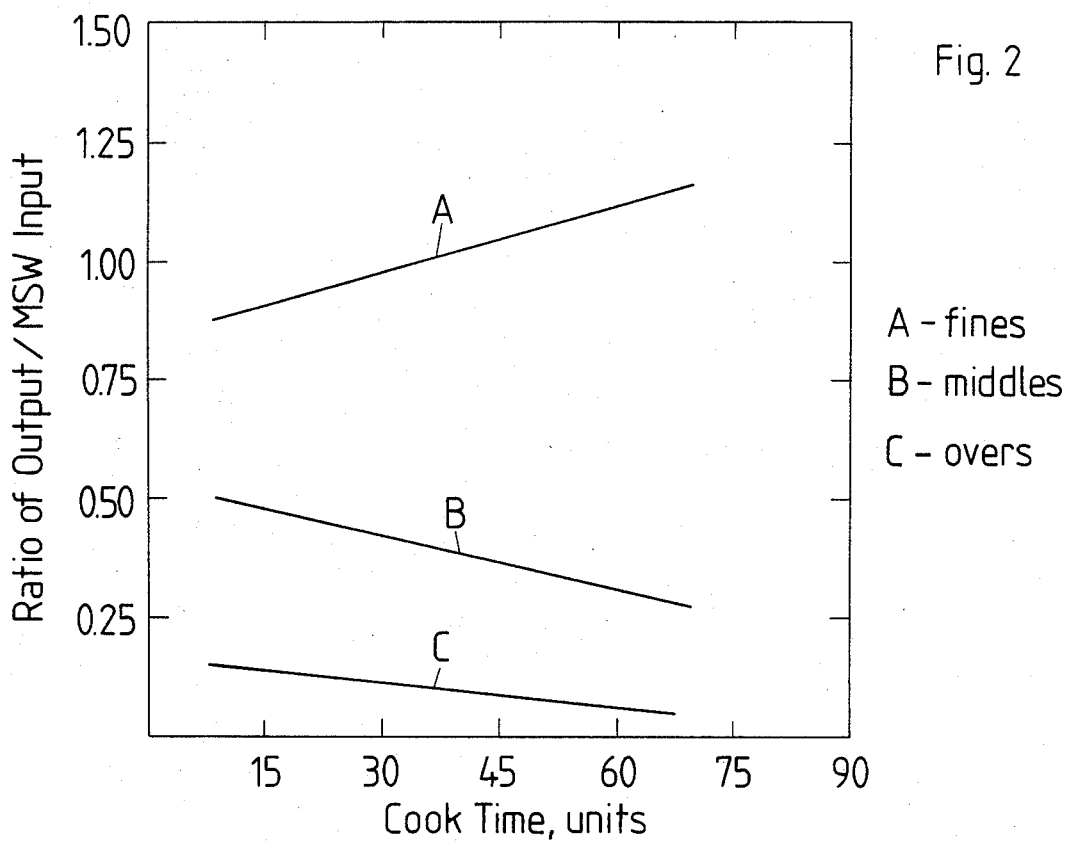
FIG. 2 is a graph showing the effect of cook time on the distribution of processed municipal solid waste among materials having fine size particles, middle size particles and larger size particles.

The cook time referred to herein refers to the period that starts when the pressure vessel reaches fully steam pressure and terminates when the pressure is released. Accordingly, the shorter this period, the less energy required and the more muncipal solid waste and sewage sludge which can be processed per unit of time. The graph shown in FIG. 2 shows the effect of cook time on the distribution of processed muncipal sewage waste among "fines" indicated at A, "middles" indicated at B and "overs" indicated at C. The cook pressure was about 60 pounds and the heating time was about 40 minutes. Approximately 200 pounds water was added to 600 pounds of municipal solid waste in each run. From FIG. 2, it will be seen that reducing cook time decreased the fraction of "fines" and increased that of the "middles". The weight of "overs" increased slightly with decrease in cook time with little difference being noted in its composition.

Figure 3:
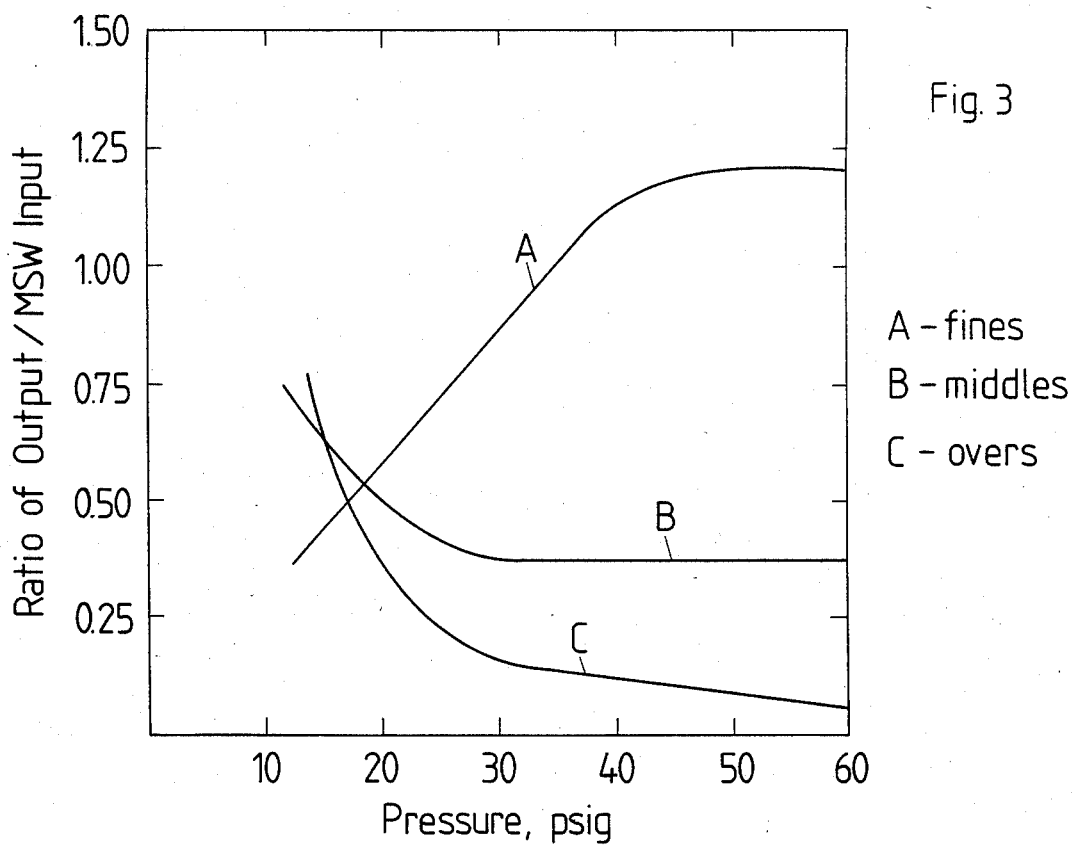
FIGS. 3 and 4 are graphs showing the effect of pressure on the distribution of processed municipal solid waste among materials having fine size particles, middle size particles and larger size particles.

In another example of carrying out my improved process, 600 pounds of municipal solid waste and 200 pounds of water were introduced into the pressure chamber 10 and steam was injected therein until the pressure chamber pressure reached 60 psig. The contents of the pressure chamber were cooked at this pressure for 60 minutes. When the weight of the three fractions "overs", "middles" and "fines" were compared with that of the starting municipal solid waste, the yield of the "fines" dropped off rapidly below 40 psig. FIG. 3 shows the effect of pressure on the distribution of processed municipal solid waste in the above example wherein the cook time was 60 minutes and approximately 200 pounds of water was added to 600 pounds of municipal solid waste.

Figure 4:
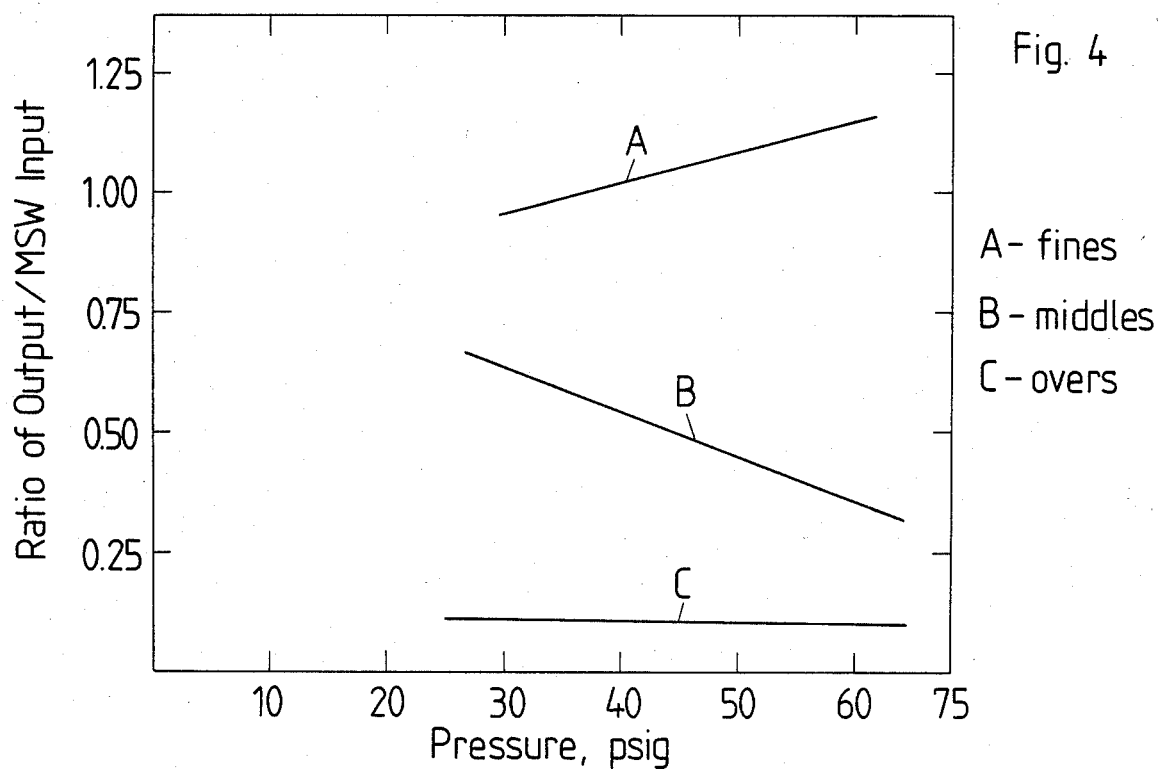

FIG. 4 shows the effect of pressure on the distribution of processed municipal solid waste among "fines", "middles" and "overs" wherein the cook time was 30 minutes and approximately 200 pounds of water was added to 600 pounds of municipal solid waste. In this example, a decrease in the fractional weight of "fines" and increase in that of "middles" were noted with decreasing pressure. Subsequent experiments performed in the pressure range of 50 to 60 psig indicated no significant differences.

Figure 5:
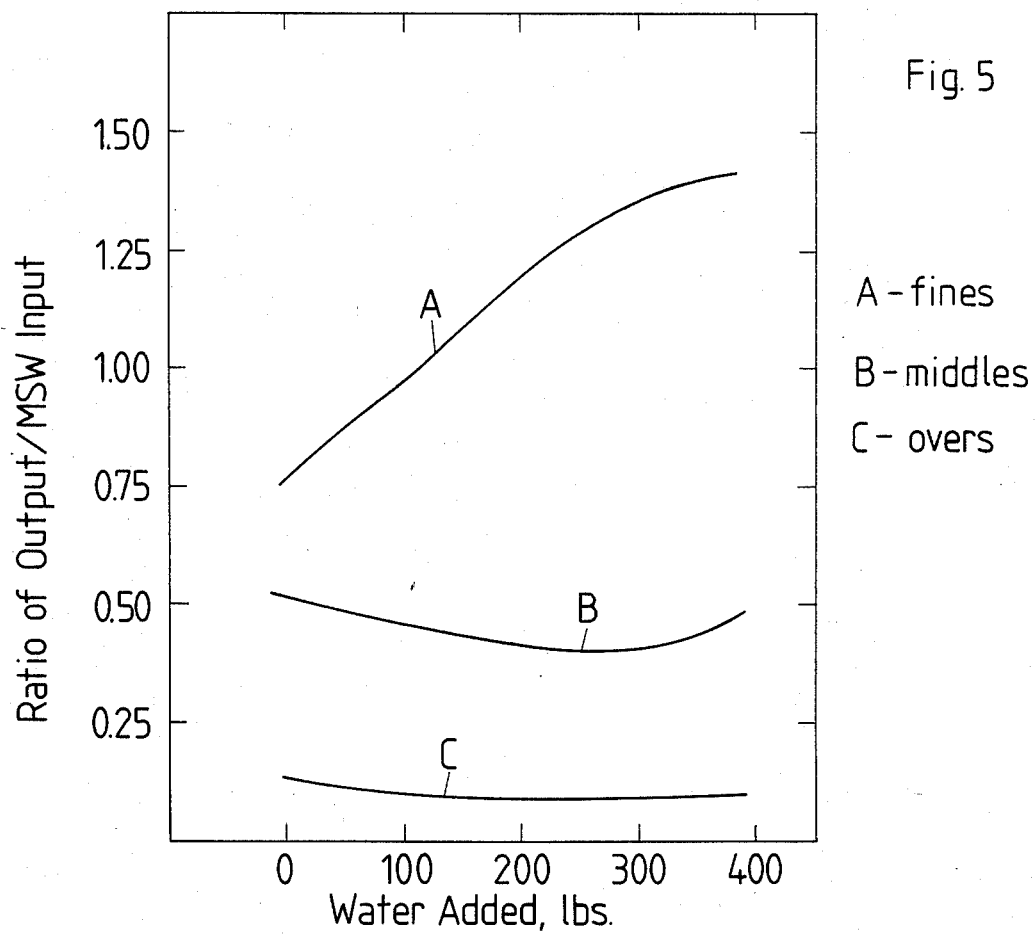
FIG. 5 is a graph showing the effect of the amount of water added per 600 pounds of municipal solid waste in the distribution of processed municipal solid waste among materials having fine size particles, middle size particles and larger size particles; and, FIG. 6 is a graph showing the effect of total steam used during the run on the distribution of processed municipal solid waste among materials having fine size particles, middle size particles and larger size particles.

In actual practice, I have found that changes in the amount of water or sewage sludge (4% solids) added to the municipal solid waste had considerable effect on the ability to screen the steam classified organics. The most effective screening was with material having a moisture content ranging from 60 to 70 percent. This level was observed with the addition of 200 to 400 pounds of water per 600 pounds of municipal solid waste. This is illustrated in FIG. 5 of the drawings.

Figure 6:
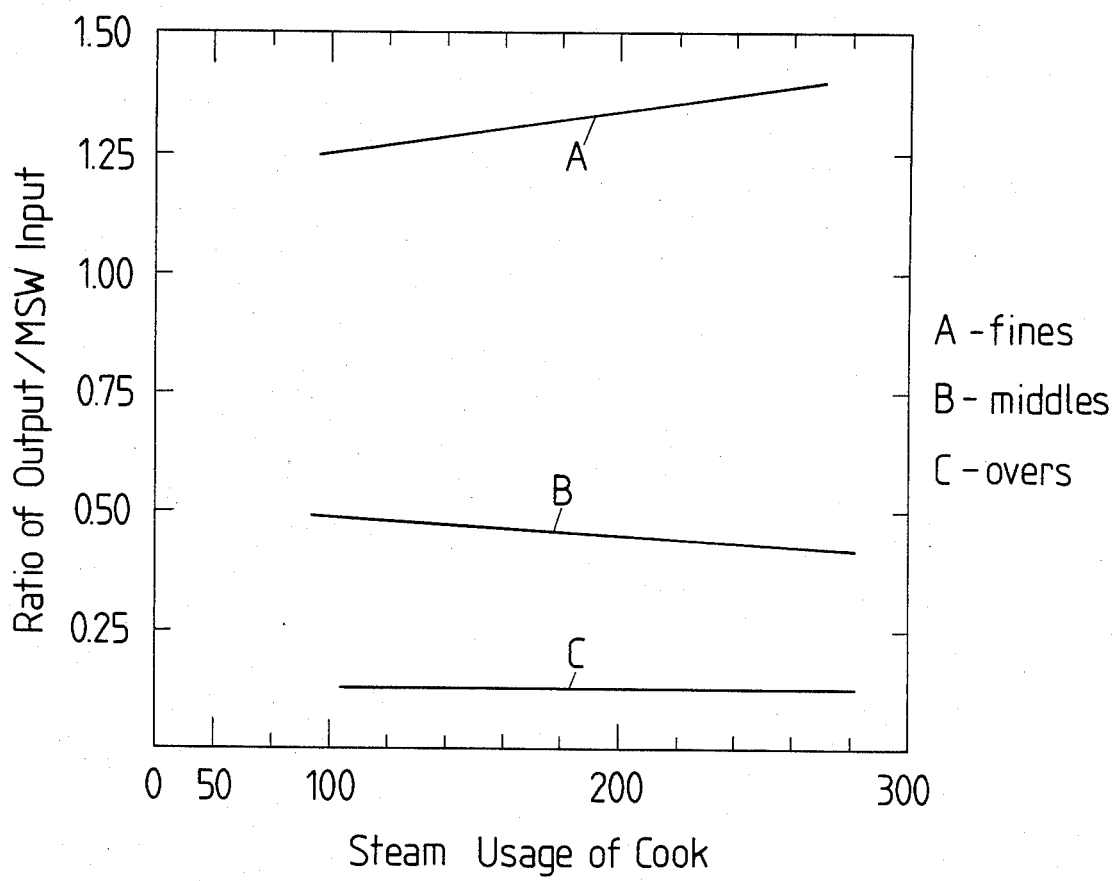

In actual practice, I have found that the optimum operating conditions are approximately 60 minutes cook time, 50 psig of steam pressure and with the moisture content being controlled in the pressure chamber to produce fines of the organic fraction which have a residual moisture content of about 65%. I have found that approximately 600 pounds of municipal solid waste and 200 pounds of water or sewage sludge processed at 50 psig pressure for a period of 60 minutes produces such a moisture content of about 65%. The data in FIG. 6 indicates that sewage sludge can be added to municipal solid waste as a substitute for water with no significant effect on steam classified organics.

I have found that the "middles" usually represent about 30% as much material as the "fines" in the processed municipal solid waste. Also, the "middles" includes the steam classified organics which are too coarse to pass through the ½ inch mesh screen but are fine enough to pass through the 2 inch mesh screen 22. Such steam classified organics are much too coarse for subsequent hydrolysis to glucose.

From the foregoing, it will be seen that I have devised an improved process for treating municipal solid waste material for the separation and recovery of inorganic matter and organic matter which greatly reduces the dependency upon land fills for the disposal of municipal solid waste materials. It is believed that my improved process will reduce the volume of municipal solid waste to be land filled by approximately 92%. Such a volume reduction would result from the removal of "fines", reprocessing of "middles" and recycling of ferrous and non-ferrous materials. It will also be seen that I have devised an improved process for recovering valuable materials which heretofore have been land filled.

I wish it to be understood that I do not desire to be limited to the precise examples, proportions or embodiments herein disclosed for obvious modifications will occur to a person skilled in the art.

What I claim is:

1. The process for treating municipal solid waste material in the presence of moisture for the separation and recovery of inorganic matter and organic matter comprising fermentable vegetable material, comprising the following steps:
   (a) feeding said waste material into a pressure chamber,
   (b) agitating said waste material while in said pressure chamber in the presence of moisture,
   (c) subjecting said waste material in said pressure chamber to heat under a pressure ranging from approximately 40 psig to 75 psi for a period ranging from approximately 30 minutes to 90 minutes to cook and sterilize said waste material and soften said organic matter contained therein,
   (d) controlling the moisture content of said waste material cooked in said pressure chamber so that the fines of said organic fraction thereof have a residual moisture content ranging from approximately 60% to 70%, (e) releasing the pressure from said chamber,
(f) discharging the cooked waste material from said chamber, and
(g) separating and classifying said cooked waste material into various fractions thereof, including an inorganic fraction and the fines of said organic fraction having a residual moisture content ranging from approximately 60% to 70%.

2. The process for treating municipal waste material as defined in claim 1 in which said waste material in said chamber is heated to a temperature ranging from approximately 270° F. to 320° F.

3. The process for treating municipal waste material as defined in claim 1 in which steam under pressure is introduced into said pressure chamber to heat and pressurize said waste material therein.

4. The process for treating municipal waste material as defined in claim 1 in which said waste material is subjected to heat and pressure in said pressure chamber for a period of approximately 60 minutes.

5. The process for treating municipal waste material as defined in claim 1 in which said waste material in said pressure chamber is subjected to a pressure of approximately 50 psig.

6. The process for treating municipal waste material as defined in claim 1 in which the residual moisture content of the fines of said organic fraction is approximately 65%.

7. The process for treating municipal waste as defined in claim 1 in which the volume of all constituents fed into said pressure chamber does not exceed approximately 70% of the total volume of said pressure chamber.

8. The process for treating municipal waste as defined in claim 1 in which approximately 1 to 2 parts by weight water are added to 3 parts by weight of said waste material.

9. The process for treating municipal waste as defined in claim 8 in which at least a part of the water added is in the form of sewage sludge.

10. The process for treating municipal waste as defined in claim 1 in which approximately 2 to 3 parts by weight water is added to 6 parts by weight of said waste material.

* * * * *